(12) United States Patent
Zeng

(10) Patent No.: US 7,637,488 B2
(45) Date of Patent: Dec. 29, 2009

(54) MULTIPLE PURPOSES CUTTING BOARD

(76) Inventor: Lingdong Zeng, Waisha Industrial Area, Shenwan Town, Zhongshan City, Guangdong, 528462 (CN)

( * ) Notice: Subject to any disclaimer, the term of this patent is extended or adjusted under 35 U.S.C. 154(b) by 147 days.

(21) Appl. No.: 11/888,810

(22) Filed: Aug. 2, 2007

(65) Prior Publication Data
US 2009/0014935 A1    Jan. 15, 2009

(51) Int. Cl.
*B23Q 3/00*    (2006.01)
(52) U.S. Cl. ............................ 269/302.1; 269/289 R
(58) Field of Classification Search ............ 269/289 R, 269/8, 302.1
See application file for complete search history.

(56) References Cited

U.S. PATENT DOCUMENTS

| | | | | |
|---|---|---|---|---|
| 5,626,067 A | * | 5/1997 | Lothe ........................ 83/761 |
| 6,422,551 B1 | * | 7/2002 | Brotz ..................... 269/289 R |
| 6,651,970 B2 | * | 11/2003 | Scott ..................... 269/289 R |
| 7,036,809 B1 | * | 5/2006 | Mitchell ................. 269/289 R |
| 7,125,011 B2 | * | 10/2006 | McLaughlin ........... 269/289 R |
| 7,213,806 B2 | * | 5/2007 | Mitchell ................. 269/289 R |
| 2002/0149148 A1 | * | 10/2002 | Chen ..................... 269/289 R |
| 2002/0195763 A1 | * | 12/2002 | Benjamin ............... 269/289 R |
| 2003/0071406 A1 | * | 4/2003 | Sellers ................... 269/289 R |
| 2007/0267800 A1 | * | 11/2007 | Zeng ....................... 269/302.1 |
| 2009/0014935 A1 | * | 1/2009 | Zeng ....................... 269/302.1 |

* cited by examiner

*Primary Examiner*—Lee D Wilson

(57) ABSTRACT

A cutting board, which is used for the preparation of all food types respectively in a kitchen. The cutting board includes a board body having a receiving cavity and two cutting surface, a plurality of cutting panel differed in appearance is received within the receiving cavity in overlapped manner. The size of the cutting panel is less than the size of the board body, such that a user is able to selectively extract appropriate cutting panel and detachably mount onto the cutting surfaces for preparing different type of foods.

3 Claims, 5 Drawing Sheets

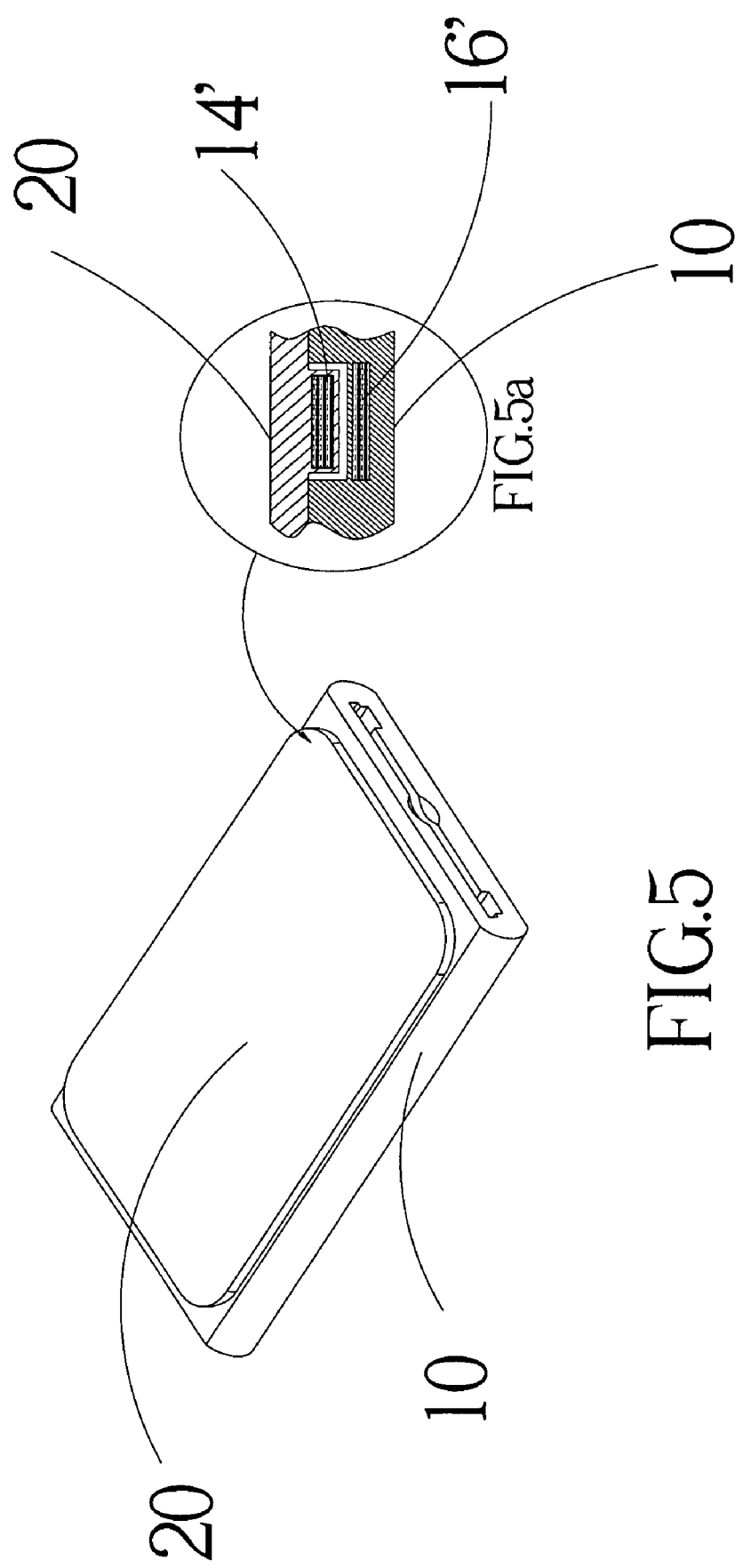

MULTIPLE PURPOSES CUTTING BOARD

BACKGROUND OF THE PRESENT INVENTION

1. Field of Invention

The present invention relates to a food cutting board, and more particularly, relates to a cutting board having at least a plurality of distinguishable cutting panels for conveniently and friendly facilitating users to selectively prepare different kinds of foods thereon, wherein these cutting panels are distinguished by colors or materials.

2. Description of Related Arts

Cutting board is a necessity widely used for food preparation. A conventional cutting board is usually embodied as a base plate, made of one kind of material, such as wood or plastic, and either surface of the base plate could be utilized as a serving side for preparing the foods. However, all types of food, like vegetable, meat, fish and fruit, would have to be cut on the same serving surface, thus unavoidably causing cross-contamination.

That is to say, if raw foods and cooked foods are prepared on the same surfaces of a cutting board, the raw foods would more or less leave some chip-breakings on the cutting board. Even after being washed in a timely manner, the cutting board still has a few chip-breakings left on the cutting surface. These residual chip-breakings may gradually lead to the breeding of bacteria on the cutting surface after prolonged use of the cutting board.

If cross-contamination were not handled properly, the transfer of harmful bacteria to food from other foods, cutting boards, utensils would cause health problems. This is especially true when handling raw meat, poultry, and seafood. It will be always right to keep those foods and their juices away from already cooked or ready-to-eat foods and fresh produce. When handling foods, it is highly recommended to keep foods apart. Recently, it is seen that plastic cutting boards poured into the market to replace conventional wood cutting boards. However, the cutting grooves are still existed.

To solve this dilemma, most housewives prefer to use one cutting board for fresh produce and another one for raw meat, poultry, and seafood. Once one of such the cutting boards became excessively worn or develop hard-to-clean grooves, they would replace them immediately. However, users would have reserve at least two cutting boards in place, and switch them from time to time in routine cooking activities.

However, multiple conventional cutting boards would unnecessarily occupy kitchen spaces. For example, if a user wishes to prepare fruit, raw meat, poultry and fish respectively, he or she must prepare at least four cutting boards. Furthermore, after a prolonged time of services, user will complain how to distinguish respective cutting boards for different foods since most of the cutting boards are identical. Then, some user has to add some stickers to certain boards.

Conclusively, it is foreseeable that a cutting board having a plurality of distinguishable cutting panels for separately preparing a variety of foods would be welcome within the art.

SUMMARY OF THE PRESENT INVENTION

A primary object of the present invention is to provide a cutting board having at least two distinguishable cutting panels so as to enable user to selectively prepare different kind of foods respectively.

Another object of the present invention is to provide a cutting board, wherein either side of the cutting board could be used as a cutting surface.

Another object of the present invention is to provide a cutting board, wherein the distinguishable cutting panels, differed with colors, materials, or added tags, could be securely, detachably, and conveniently mounted onto either side of the cutting boards for cutting purposes.

Another object of the present invention is to provide a cutting board, having a receiving cavity for storing a plurality of cutting panels in overlapped manner, therefore, all cutting panel could be reserved within limited space.

Another object of the present invention is to provide a cutting board having a plurality of distinguishable cutting panels, wherein such cutting panels are either received within the cutting board within an overlapped manner, or capable of being respectively extracted from the cutting board for cutting purposes.

Another object of the present invention is to provide a cutting board, wherein either side of the distinguishable cutting panels are serviceable, such that a user is able to easily turn over such cutting panel for preparing different type of foods.

Another object of the present invention is to provide a cutting board, wherein such cutting board are not only embodied as cutting surface, but also embodied as a protective casing, such that the plurality of cutting panels are not directly exposed to outside dust or other contamination sources.

Another object of the present invention is to provide a cutting board for preparing a variety of foods with a clean and effective manner, wherein no complicated structure or expensive parts would be required to accomplish above mentioned objects.

Another object of the present invention is to provide a cutting board, wherein the cutting panel can securely mount on the board body when using the cutting panel.

Accordingly, in order to accomplish the above objects, the present invention provides a cutting board for respectively preparing a variety of foods, the cutting board comprises:

a board body having a pair of opposed serving surfaces and a receiving cavity;

a plurality of cutting panels received within the receiving cavity and operated between a storing position to an operating position, wherein in the storing position, the cutting panels are stacked within the receiving cavity with an overlapped manner, wherein in the operating position, the cutting panels are respectively extracted from the receiving cavity for cutting purposes.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 5 illustrates an alternative perspective view of cutting panel and board body, when mounting the cutting panel on the board body according to the above preferred embodiment of the present invention.

DETAILED DESCRIPTION OF THE PREFERRED EMBODIMENT

Figure 1:
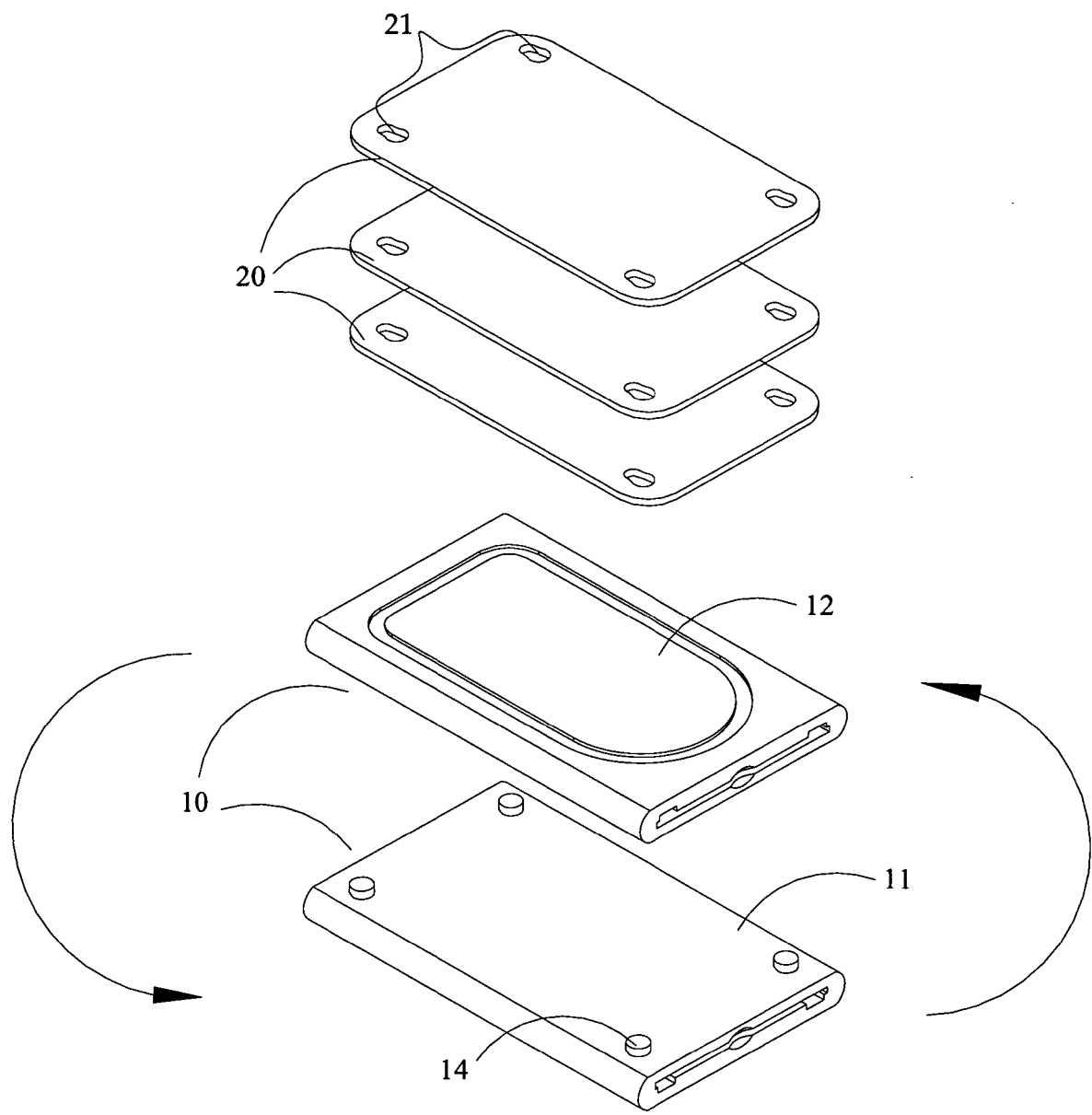
FIG. 1 is a perspective view of a cutting board according to a preferred embodiment of the present invention.
Figure 2:
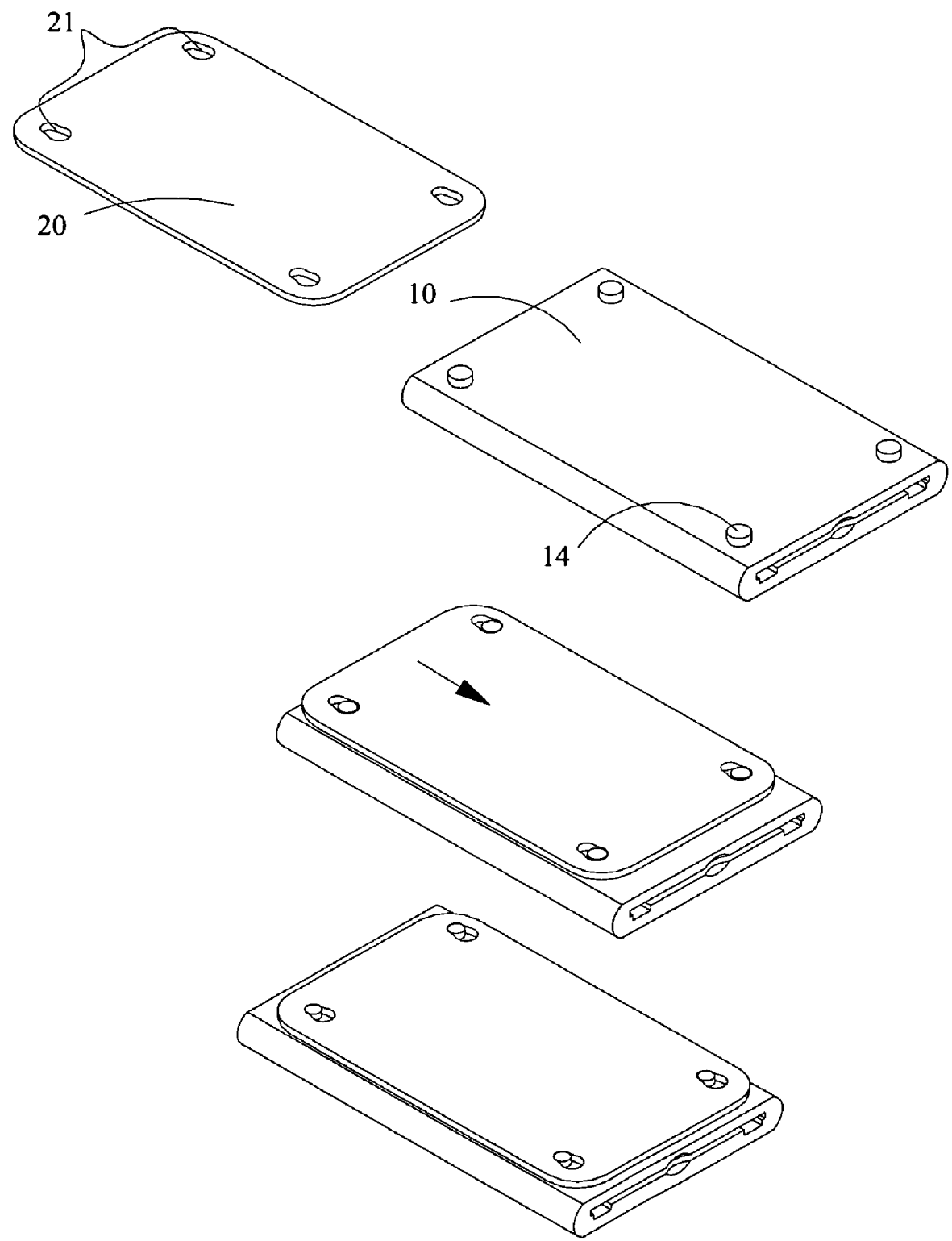
FIG. 2 is an operate process view of the cutting board according to the above preferred embodiment of the present invention, illustrating install steps of the cutting board.
Figure 3:
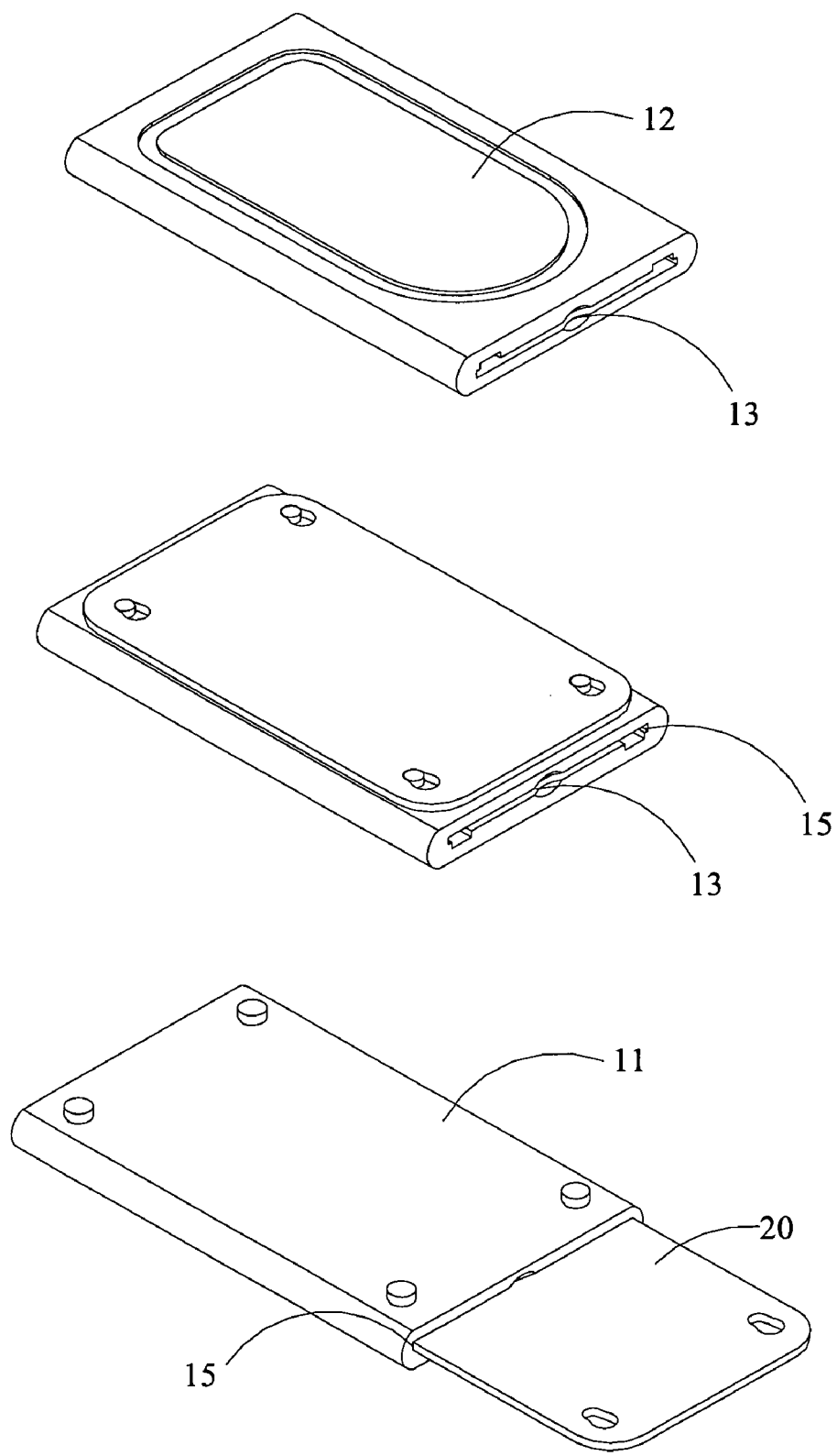
FIG. 3 is another operates process view of the cutting board according to the above preferred embodiment of the present invention, illustrating install steps of the cutting board.

Referring to FIG. 1 of the drawings, a cutting board according to a preferred embodiment of the present invention is illustrated. The cutting board is adapted to prepare a variety of foods in separate and healthy manner. The cutting board comprises a board body 10 having a pair of opposed serving surfaces 11, 12 and a receiving cavity 13. Furthermore, the cutting board comprises a plurality of cutting panels 20 received within the receiving cavity 13 and operated between a storing position to an operating position, wherein in the storing position, the cutting panels 20 are stacked within the receiving cavity 13 with an overlapped manner, wherein in the operating position, the cutting panels 20 are respectively extracted from the receiving cavity 13 for cutting purposes.

In the present invention, the board body 10 is embodied as a rectangular shaped base plate, made of wood, plastic and other materials. And the cutting panels 20 are correspondingly shaped matching with the board body 10 but with smaller size. Preferably, the cutting panels 20 are made of cutting suitable materials, such as heat resistant materials, Polypropene.

It is noted that the board body 10 is merely a conventional cutting board with either side surface serviceable in practice. In the present invention, the board body 10 is not a solid body. Instead, it is applied as a rectangular casing defining a receiving cavity for storing cutting panels 20.

As shown in FIG. 1, either side of the board body 10 is embodied as cutting surface having a plurality of mounting member 14 provided thereon. In the present invention, the mounting member 14 are four buttons respectively extended and squared at four corners of each serving surfaces 11, 12.

On the other hand, each of the cutting panels 20 is prepared with corresponding mounting openings 21 at four corners thereon for detachably mounting the cutting panels 20 onto the board body 10. It is noted that the cutting panels 20 are prepared with different colors, such that a user is able to easily distinguish the cutting panel from the receiving cavity 13 and immediately extract desirable cutting panel 20 for function. For example, the fruit panel is red color, the meat panel is green color and the fish panel is blue color. However, the corresponding colors are changeable between different foods. Since the cutting panels 20 are exchangeable and extractable from the receiving cavity 13, a user is able to efficiently and selectively choose the appropriate cutting panel for prepare different foods.

What is more, each of the cutting panels 20 is marked with stickers or tags. As a result, a new user could easily choose the right panel without asking the original users. He or she just read the tags and then extract one of such cutting panels from the receiving cavity 13 and attach the cutting panel 20 onto either serving surface 11 or 12 of the board body 10 for food preparing purpose.

Or otherwise, the mounting member 14 could be embodied as four flat clasps provided at each corner of the serving surfaces 11, 12 for temporarily locking the cutting panels 20 on position.

Figure 4:
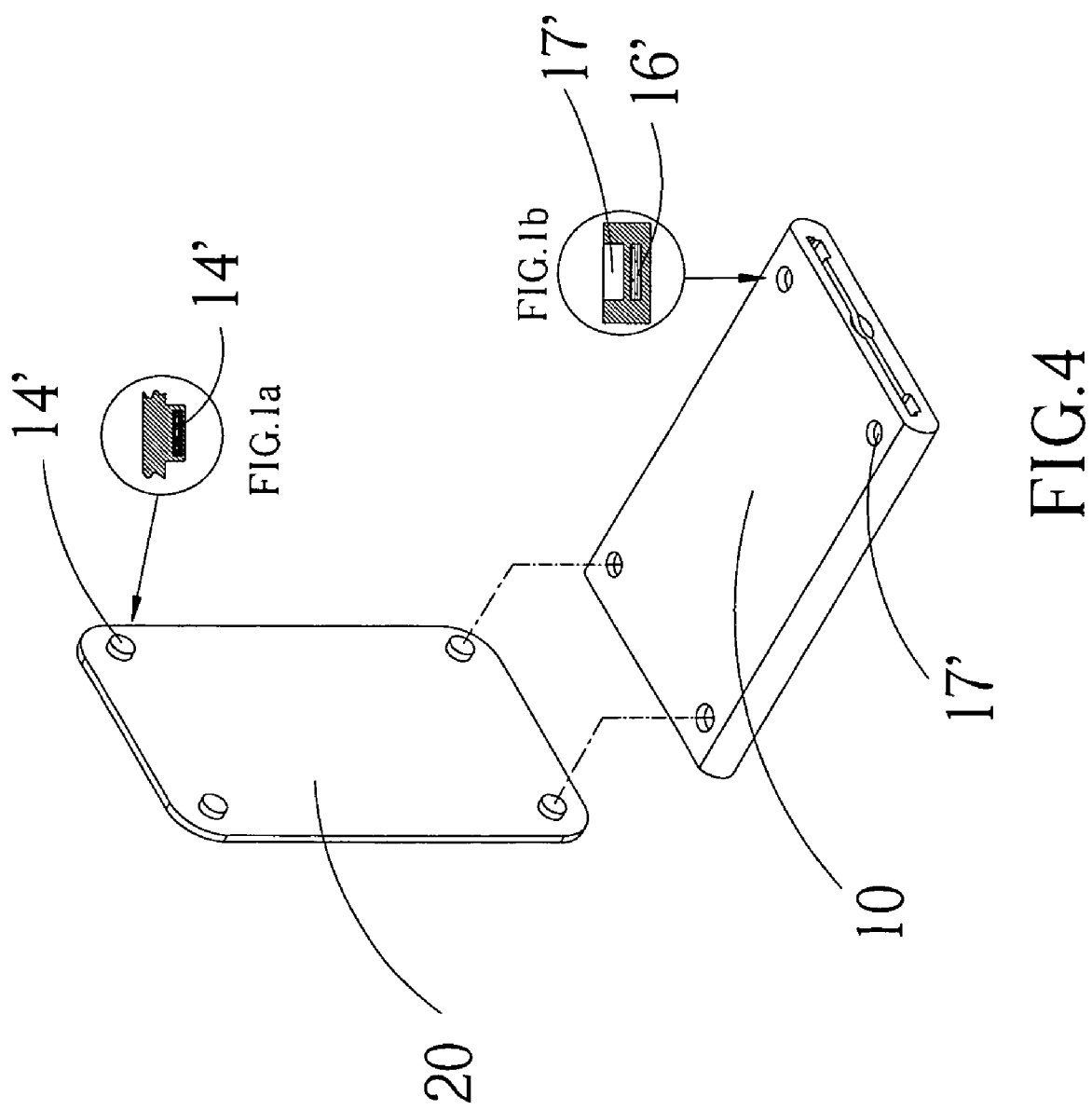
FIG. 4 illustrates an alternative perspective view of cutting panel and board body, when they are separated according to the above preferred embodiment of the present invention.

Referring to FIG. 4 and FIG. 5, an alternative mode of the mounting member 14 are illustrated. The above mentioned mounting members 14 provided at the cutting surfaces 11, 12 and the mounting opening 21 defined onto the cutting panel 20 could be replaced by more convenient magnet/steel combination.

Briefly, the mounting member 14 could be embodied as at least a first magnetic member 14', while the cutting panel 20 further comprises one or more second magnetic member 16' located at corresponding positions to match the first magnetic member 14'. Notably, either the first magnetic member 14' or the second magnet member 16' is made of natural magnet, whereas the remaining counterpart is made of magnet attractive steel. As a result, whenever the cutting panel 20 and the board body 10 are approaching with each other, the magnet and the steel will attract with each other so as to attach the cutting panel 20 onto the board body 10.

It is worth mentioning that the magnet attractive steel could be applied as chrome, nickel, iron and the like. Therefore, either of the first magnetic member 14' or the second magnetic member 16' could be embodied as corrosion resist steel for hygiene and aesthetic reasons.

Or otherwise, both of the first magnetic member 14' and the second magnetic member 16' could be embodied as magnets with opposite magnetism orientation so as to attract with each other. For example, the first magnetic member 14' is embodied as magnet provided at the board body 10 with North Pole exposed outside, while the second magnetic member 16' would be a magnet with South Pole exposed for attachment.

Theoretically, the first magnetic member 14' and the second magnetic member 16' can be disposed at anywhere. In this preferred embodiment, the first magnetic members 14' are provided at four corners of the board body 10. Therefore, the second magnetic members 16' are attached onto the four corners of the cutting panel 20 as well. The first magnetic member 14' and the second magnetic member 16' could be defined as any shape, but preferably, as flatten shape body embedded within the board body 10 and the cutting panel 20.

Or otherwise, the first magnetic member 14' could be received within the receiving cavity 13. It is noted that the magnetic attracting force is capable of penetrating the board body to attract the second magnetic member 16' of the cutting panel 20. According to the preferred embodiment of the present invention, the board body 10 further comprises four seating sockets 17' at four corners of the board body 10 for receiving the second magnetic member 16' extended from the cutting panel 10. The first magnetic member 14' is provided within the receiving cavity 13 at a position beneath a bottom wall of each seating socket 17'. Accordingly, whenever the second magnetic member 16 is received within the sealing socket 17', the magnetic force will penetrate the bottom wall of the seating socket 17' to securely attach the first magnetic member 14' and the second magnetic member 16 in position.

In other words, a user is able to extract the cutting panel 20 from the receiving cavity 13 first, and then align four second magnetic member 16' with the seating socket 17' provided on either side of the board body 10, such that the first magnetic member 14' provided beneath the seating socket 17' would attract the second magnetic member 16' for securely holding the cutting panel 20 onto the board body 10.

It is noted that the size of the cutting panel 20 is less than that of the board body 10 for two reasons. First of all, the cutting panel would be easily inserted into or extracted from the receiving cavity 13. Secondly, once the cutting panel 20 is detachably mounted onto the board body 10, the cutting panel 20 would be disposed onto the middle of the serving surface 11, 12 for convenient maneuverability.

The board body 10 has an elongated slot 15 for communicating the receiving cavity 13 to outside. It is noted that such elongated slot 15 has a length longer enough to cover the size of the cutting panel 20, such that the cutting panel could be easily inserted into the receiving cavity 13.

According to the preferred embodiment of the present invention, whenever the cutting panel 20 is inserted into the receiving cavity 13, a portion of the cutting panel 20 would be exposed to outside. Since the cutting panels 20 are differed in its appearance, a user is able to easily select the desired panel for service.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A cutting board for a variety of foods, comprising:
a board body having a pair of opposed serving surfaces and a receiving cavity;
a plurality of cutting panels received within said receiving cavity for cutting said foods, wherein said cutting panels are operated between a storing position and a cutting position, wherein in the storing position, the cutting panels are stacked within the receiving cavity with an overlapped manner, wherein in the cutting position, the cutting panels are respectively extracted from the receiving cavity for cutting purposes;
at least one first magnetic member provided at said board body; and
a plurality of second magnetic members disposed onto each of said cutting panels at a position correspondingly with said first magnetic member, such that whenever said cutting panel and said board body approach with each other, said first magnetic member and said second magnetic member are capable of generating a magnetic attracting force so as to detachably attach said cutting panel onto said board body,
wherein said board body comprises four said first magnetic member respectively provided at each corner of said serving surface for detachably mounting said cutting panels,
wherein said board body further comprises four seating sockets provided at four corners of said serving surfaces for receiving said second magnetic members of said cutting panel, four of said first magnetic member are provided within said receiving cavity at a position beneath a bottom wall of each said seating socket, such that whenever said second magnetic is received within said sealing socket, said first and second magnetic member generate a magnetic force penetrate said bottom wall of said seating socket to securely attach said cutting panel onto said board body.

2. A cutting board for a variety of foods, comprising:
a board body having a pair of opposed serving surfaces and a receiving cavity;
a plurality of cutting panels received within said receiving cavity for cutting said foods, wherein said cutting panels are operated between a storing position and a cutting position, wherein in the storing position, the cutting panels are stacked within the receiving cavity with an overlapped manner, wherein in the cutting position, the cutting panels are respectively extracted from the receiving cavity for cutting purposes;
at least one first magnetic member provided on said board body; and
a plurality of second magnetic members disposed onto each of said cutting panels at a position correspondingly with said first magnetic member, such that whenever said cutting panel and said board body approach with each other, said first magnetic member and said second magnetic member are capable of generating a magnetic attracting force so as to detachably attach said cutting panel onto said board body,
wherein said board body comprises four said first magnetic member respectively provided at each corner of said serving surface for detachably mounting said cutting panels, wherein said first magnetic member is made of magnet and said second magnetic member is made of magnet attractive steel selected from a group consisting of chrome, nickel, iron and so on,
wherein said board body further comprises four seating sockets provided at four corners of said serving surfaces for receiving said second magnetic members of said cutting panel, four of said first magnetic member are provided within said receiving cavity at a position beneath a bottom wall of each said seating socket, such that whenever said second magnetic member is received within said sealing socket, said first and second magnetic member generate a magnetic force penetrate said bottom wall of said seating socket to securely attach said cutting panel onto said board body.

3. A cutting board for a variety of foods, comprising:
a board body having a pair of opposed serving surfaces and a receiving cavity;
a plurality of cutting panels received within said receiving cavity for cutting said foods, wherein said cutting panels are operated between a storing position and a cutting position, wherein in the storing position, the cutting panels are stacked within the receiving cavity with an overlapped manner, wherein in the cutting position, the cutting panels are respectively extracted from the receiving cavity for cutting purposes;
at least one first magnetic member provided on said board body; and
a plurality of second magnetic members disposed onto each of said cutting panels at a position correspondingly with said first magnetic member, such that whenever said cutting panel and said board body approach with each other, said first magnetic member and said second magnetic member are capable of generating a magnetic attracting force so as to detachably attach said cutting panel onto said board body,
wherein said board body comprises four said first magnetic member respectively provided at each corner of said serving surface for detachably mounting said cutting panels,
wherein said second magnetic member is made of magnet and said first magnetic member is made of magnet attractive steel selected from a group consisting of chrome, nickel, iron and so on,
wherein said board body further comprises four seating sockets provided at four corners of said serving surfaces for receiving said second magnetic members of said cutting panel, four of said first magnetic member are provided within said receiving cavity at a position beneath a bottom wall of each said seating socket, such that whenever said second magnetic member is received within said sealing socket, said first and second magnetic member generate a magnetic force penetrate said bottom wall of said seating socket to securely attach said cutting panel onto said board body.

* * * * *